US010984645B2

(12) United States Patent
Wojcik et al.

(10) Patent No.: US 10,984,645 B2
(45) Date of Patent: Apr. 20, 2021

(54) REMOVAL DETECTION OF A WEARABLE COMPUTER

(71) Applicants: Mark Wojcik, Littleton, CO (US); Arthur Jacob Gigler, Littleton, CO (US)

(72) Inventors: Mark Wojcik, Littleton, CO (US); Arthur Jacob Gigler, Littleton, CO (US)

( * ) Notice: Subject to any disclaimer, the term of this patent is extended or adjusted under 35 U.S.C. 154(b) by 0 days.

(21) Appl. No.: 16/779,129

(22) Filed: Jan. 31, 2020

(65) Prior Publication Data

US 2020/0250953 A1 Aug. 6, 2020

Related U.S. Application Data

(60) Provisional application No. 62/799,534, filed on Jan. 31, 2019.

(51) Int. Cl.
*H04B 3/36* (2006.01)
*G08B 21/02* (2006.01)
*G08B 6/00* (2006.01)

(52) U.S. Cl.
CPC .......... *G08B 21/0286* (2013.01); *G08B 6/00* (2013.01)

(58) Field of Classification Search
CPC ...... G08B 21/0286; G08B 6/00; G08B 21/22; H01Q 1/273; H01Q 5/40; H01Q 9/42; H01Q 5/371; H01Q 5/35; H01Q 1/48; H01Q 7/00; H01Q 1/38; H01Q 1/2291; H01Q 1/241; G04G 17/04; G04G 21/04; G04R 60/06
USPC ................................ 340/407.1, 573.1, 573.4
See application file for complete search history.

(56) References Cited

U.S. PATENT DOCUMENTS 5,075,670 A * 12/1991 Bower .................. G08B 21/22 340/573.4
5,905,461 A 5/1999 Neher
6,072,396 A 6/2000 Gaukel
6,388,612 B1 5/2002 Neher
7,382,268 B2 6/2008 Hartman
9,939,784 B1 4/2018 Berardinelli
2004/0036572 A1 2/2004 Forster
2011/0248853 A1 10/2011 Roper et al.
(Continued)

FOREIGN PATENT DOCUMENTS

CN 102724627 A1 10/2012
CN 202854528 B1 4/2013
(Continued)

*Primary Examiner* — Anh V La
(74) *Attorney, Agent, or Firm* — Brenda L. Speer, LLC; Brenda L. Speer

(57) ABSTRACT

Offender location tracking devices have evolved to a point where they are wearable computers. Modern smartwatches are also wearable computers and can be used as offender tracking devices; however, they have the limitation of not being able to detect if they are being tampered with or are removed. A novel security band of the present invention can be used in conjunction with a commercially available smartwatch. The security band of the present invention is able to detect if it is cut or removed and is able to wirelessly notify a smartwatch or optional smartphone. The notification is then relayed to a monitoring center or supervising authority using a cellular telephone network or other wireless communication method.

14 Claims, 7 Drawing Sheets

(56) References Cited

U.S. PATENT DOCUMENTS

| | | | | |
|---|---|---|---|---|
| 2015/0094547 | A1* | 4/2015 | Mickle | A61B 5/4851 600/302 |
| 2018/0049028 | A1* | 2/2018 | Tali | H04L 63/0861 |
| 2018/0059714 | A1* | 3/2018 | Martin | G06F 1/163 |
| 2018/0153450 | A1* | 6/2018 | Routh | A61B 5/6861 |
| 2018/0211718 | A1* | 7/2018 | Heath | A01K 29/005 |
| 2018/0249288 | A1 | 8/2018 | LeJeune, Jr. | |
| 2018/0294553 | A1* | 10/2018 | Lim | H01Q 1/48 |

FOREIGN PATENT DOCUMENTS

| | | | |
|---|---|---|---|
| CN | 104688205 | A1 | 6/2015 |
| CN | 103989295 | B2 | 8/2015 |
| EP | 2255216 | B1 | 9/2014 |

* cited by examiner

REMOVAL DETECTION OF A WEARABLE COMPUTER

CROSS-REFERENCE TO RELATED APPLICATION(S)

This application claims the benefit of priority under 35 U.S.C. § 119(e) from U.S. Provisional Application Ser. No. 62/799,534, filed Jan. 31, 2019, titled "Removable Detection of a Wearable Computer" and the entire contents of which are incorporated by reference herein and should be considered a part of this specification.

BACKGROUND OF THE INVENTION

Field of the Invention

The field of the invention relates to tamper or removal detection of a wearable computer.

Description of Related Art Including Information Disclosed Under 37 CFR 1.97 and 37 CFR 1.98

There are many applications for location monitoring of objects, people, and animals using Global Positioning System (GPS) technology. One of these applications is monitoring the location of people in the criminal justice or corrections system who are on probation, who may be awaiting a court hearing or trial, or who have been released from jail or prison, but are on parole. Such people generically referred to herein as 'offenders' for simplicity with the understanding that not all of these people have been convicted of crime.

Electronic methods of monitoring the location of offenders has its origins in the 1980s when home-arrest or house-arrest systems first started being used. These systems require the offender to wear an electronic ankle bracelet (also known as an ankle monitor, anklet, or tag). The ankle bracelet periodically communicates with a stationary device in the person's home called a base-station (also known as a base-unit, home-unit, or beacon) using a wireless radio frequency (RF) link. The base-station has a telephone connection for communicating with a supervising authority. The geographical range of the RF link is limited, so when the offender moves beyond that range the ankle bracelet and base-station are no longer able to communicate, and a notification is sent to the supervising authority using the telephone connection. More recent base-stations use a wireless or cellular telephone connection instead of a wired or landline connection.

A more recent generation of offender location monitoring systems incorporates GPS and wireless or cellular telephone technology into the ankle-bracelet. This eliminates the need for a home base-station and also expands capability beyond just knowing if and when the offender left his or her home. These ankle bracelets continuously record the location of the offender over time and regularly transmit the time-stamped location data to a supervising authority. Using a computer software and mapping program, the supervising authority can know the location of the offender throughout the day, set up geographical zones to which the offender is restricted (e.g., home or work), or from which the offender is restricted (e.g., victim's home, known drug house), and receive notifications if and when the offender does leave or enter a designated zone. Zones can have schedules associated with them so that they are only applicable during certain days and hours, and they can also be dynamic (e.g., a boundary set around a moving object such as a victim, who also has a location tracking device sending data to the same system).

The most current version of this generation of offender location monitoring system incorporates numerous technologies into the ankle bracelet, including a computer microcontroller, a GPS receiver, computer memory, a cellular radio (also known as a cellular modem or cellular chip), a wireless RF transmitter and receiver, a WiFi (wireless fidelity) transmitter and receiver, a Bluetooth transmitter and receiver, a battery, battery charging and electrical power management circuitry, an audible sound, vibrating buzzer, buttons, and several features and technologies used for tamper and removal prevention and detection. These ankle bracelets have evolved to a point that they contain almost all the same technologies as a modern cellular phone, smartphone, or smartwatch, and are wearable computers.

A smartwatch is a computerized wristwatch with functionality that goes beyond timekeeping. Early smartwatches acted as activity trackers, fitness trackers, and 'GPS watches' that were intended for outdoor sports. These devices evolved to wirelessly interface with smartphones so their settings and data can be viewed, manipulated, and analyzed using a smartphone software program (or application, also referred to as an 'app') and can also be transmitted to a computer database via the smartphone's wireless or cellular or WiFi functionality. The user can then access that data using a web-based computer software program. When GPS location points are part of the data transmitted, the computer software program has mapping functionality.

Another generation of smartwatches can also act as wireless interfaces to smartphones, allowing the user to make phone calls, and view text messages, reminders, and appointments without holding the smartphone in their hand. The most recent smartwatches have incorporated the wireless or cellular functionality internally and are fully functional as stand-alone devices that can act as replacements for smartphones. These devices are wearable computers that contain a computer microcontroller, a GPS receiver, computer memory, a cellular radio, a WiFi transmitter and receiver, a Bluetooth transmitter and receiver, a battery, battery charging and electrical power management circuitry, audible sounds, haptic or vibrating features, a display, and a user interface with button-like functionality. The only thing these recent smartphones are missing that is required for offender location monitoring are features and technologies used for tamper and removal prevention and detection.

Tamper and removal prevention and detection creates a unique challenge for offender location monitoring that may not be as prevalent in other applications (e.g., tracking children, elderly, pets, livestock, vehicles, cargo, or the other movable lifeforms or objects). It is known that some offenders will deliberately tamper with and attempt to remove their ankle bracelets, so they are no longer tracked, thereby creating a public safety issue. To counteract this problem numerous features and technologies are used to prevent an offender from removing their bracelet, or for the supervising authority to be notified if they do remove it. The simplest of these features is to have the bracelet worn above the ankle instead of on the wrist, as it is generally considered much harder to slip a device off around the foot than the hand. Next, the strap (or band) and its fastening method is usually designed in a way that any fastening hardware or features are inaccessible after the ankle bracelet is mounted to the offender. Therefore, to remove the ankle bracelet the offender must either cut the strap or break it off in a way that is very evident and cannot be re-assembled. Some systems further use a strap material that is very strong or thick, so it is nearly impossible to cut through using common household tools.

The aforementioned features do not prevent the most resolute offenders from removing their ankle bracelets, so additional technology must be used to notify the supervising authority if a strap is cut or bracelet is removed. The most common technology is to embed an electrically conductive element such as a wire or flexible circuit into the strap. Although there are numerous ways to implement this technology electrically and mechanically, in its simplest form an electrical signal is applied to one end of the conductor and monitored at the other end. If the strap is cut or pulled from its mounting, the electrical signal is interrupted or altered, and the ankle bracelet notifies the supervising authority of a 'cut strap' or 'open strap' via wireless or cellular communication. Many implementations of this technology replace the electrically conductive element with an optical fiber, which is less prone to being stretched and nearly impossible to circumvent by 'jumpering' or 'hot-wiring'. Another technology used for removal detection is optical sensing, using either visible or infrared (IR) light frequencies. A beam of light is emitted, then reflected off the offender's leg, and the reflected light is detected by a receiver. Detected light falling outside of certain limits is indicative of a leg no longer being present and therefore of a bracelet removal. An optical sensor may also be placed to reflect off a component internal to the ankle bracelet in order to detect a 'case breach' or 'housing breach'. Other technologies used to detect removal are measuring the electrical capacitance of the leg, leg or body temperature, electrodermal activity [such as skin conductance and galvanic skin response (GSR)], photoplethysmography (PPG) or pulse oximetry sensors, and even electrocardiography (ECG) signatures.

In addition to the foregoing, additional monitoring devices are known. Among these known devices are the following.

U.S. Pat. No. 5,905,461 issued May 18, 1999, by Neher for "Global Positioning Satellite Tracking Device" discloses a global positioning and tracking system for locating one of a person and item of property. The global positioning and tracking system comprises at least one tracking device for connection to the one of the person and item of property including a processing device for determining a location of the tracking device and generating a position signal and a transmitter for transmitting said position signal. The position signal is transmitted to a relay station strategically positioned about a desired monitoring area. The relay station includes a device for receiving the positional signal and determining if the received position signal is a valid signal and a device for relaying the position signal upon determining the position signal is valid to a central monitoring station. The central monitoring station receives the validated positional signal from the relay station and analyzes the position signal for monitoring the position of the tracking device. The system may also include a tracking satellite for receiving the validated position signal from the relay station and re-transmitting the position signal to the central monitoring station when the central monitoring station is located outside the transmission range of the relay station.

U.S. Pat. No. 6,072,396 issued Jun. 6, 2000, by Gaukel for "Apparatus and Method for Continuous Electronic Monitoring and Tracking of Individuals" discloses an apparatus and method of monitoring mobile objects or persons using the utilizes the Global Positioning System satellites and cellular telephone communications. The apparatus may include first and second remote units adapted to be worn on the monitored person or object. These remote units would comprise the position and data sensors as well as the transmitter device to transmit the information back to a central tracking station. The remote units may be operative to monitor many data items such as system integrity, motion temperature, audio, and the like in addition to position. This data would then be transmitted back to a central monitoring station operative to process and display the information. The system is also adapted to monitor persons in hazardous environments such as radioactivity or poisonous gases or even to monitor inanimate objects such as automobiles.

U.S. Pat. No. 6,388,612 issued May 14, 2002, by Neher for "Global Cellular Position Tracking Device" discloses a global positioning and tracking system for locating objects including a plurality of tracking devices each releasably secured to an object and a central monitoring station. Each tracking device includes a processing device for storing an identification code unique to the tracking device, determining a location of the tracking device and generating a position signal based upon the determined location, a cellular transmitter or receiver for receiving and initiating cellular transmissions. The central monitoring station receives a location request and identification code from a user and initiates a cellular transmission including the identification code to a telephone number assigned to the tracking units. Upon receipt of the cellular transmission each tracking unit compares the identification code with its stored identification code. The tracking unit with a stored identification code determined to match the received identification code generates and transmits a position signal to the central monitoring station via cellular transmission channels. The central monitoring station then relays the position signal to the user. The user is able to provide a location request to the central monitoring station by at least one of a telephone communication and an electronic message via an Internet connection. Each tracking device is also able to generate a distress signal for transmission to the central monitoring unit upon detection of an emergency situation or automatically upon breaking of the circuit of the tracking unit.

U.S. Pat. No. 7,382,268 issued Jun. 3, 2008, by Hartman for "Device and Method for Tethering a Person Wirelessly with a Cellular Telephone" discloses a system for monitoring activities of a person. The system has a tethering device with a battery-powered transceiver and a securement device that is attachable to a person. The securement device is configured to prevent and detect tampering and attempts to remove the securement device from the person. The system further has a cellular telephone with a transceiver operable to establish a shorter range wireless connection with the tethering device transceiver, thereby permitting tethering device information to be transmitted to the cellular telephone.

U.S. Pat. No. 9,939,784 issued Apr. 10, 2018, by Berardinelli for "Smartwatch Device and Method" discloses a smartwatch device and method comprising a first smartwatch configured to wirelessly connect said first smartwatch to an external communication device; a second smartwatch configured to wirelessly connect said second smartwatch to an external communication device; said first smartwatch being configured to display images and/or information relating to a first physiological activity specific to a first user of said first smartwatch, and said second smartwatch being configured to display images and/or information relating to a second physiological activity specific to a second user of said second smartwatch; each of said first and second smartwatches comprises an image detection arrangement configured to detect images of objects; and said image detection arrangements are configured to detect images at different locations in a building to register the locations of said first and second smart-watches and/or retrieve information regarding physiological activities to be performed at the locations.

US Patent Publication 2004/0036572 published Feb. 26, 2004, by Forster for "Wireless Communication Device Having Conductive Elements Antenna" discloses an antenna coupled to a wireless communication device that is comprised of a series of conductive elements that form a conductor when placed under a force. The conductor is coupled to a wireless communication device to provide an antenna so that the wireless communication device is capable of communicating at an operating frequency defined by the length and construction of the conductor. The wireless communication device, through its communication using the conductor as an antenna, acts as an indicator of force to an interrogation reader when the wireless communication device is capable of communicating to the interrogation reader using the conductor as an antenna.

US Patent Publication 2011/0248853 published Oct. 13, 2011, by Roper et al. for "Tracking Device Incorporating Enhanced Security Mounting Strap" discloses a mounting strap assembly of a tracking device includes a primary mounting strap and one more secondary reinforcing support straps. Continuity sensing elements and other tamper detection means detect any attempt to cut through the mounting strap assembly during an attempted removal of the tracking device from an offender or other mounted location. The reinforcing support straps keep the mounting strap assembly from being completely severed while providing authorities time to be summoned to the location where the tracking device is located and prior to the tracking device being completely removed.

US Patent Publication 2018/0249288 published Aug. 30, 2018, by LeJeune, Jr., for "Monitoring System and Method with Signal Tampering Detection" discloses a system and method for detecting potential tampering with a data stream from a monitoring device is provided. The method includes storing a list of cellular receivers and at least one corresponding geographic characteristic; receiving, from a remote monitoring device through a cellular network, a location of the monitoring device and the identity of a particular cellular receiver that relayed the location; identifying, from the received location and the stored at least one corresponding geographic characteristic, an expected cellular receiver from the list of cellular receivers; comparing the particular cellular receiver with the expect cellular receiver; and issuing an alert based on at least a negative result of the comparing.

Chinese Patent issued Apr. 3, 2013, for "Wrist Band Positioning Emitter Used for Prisoner Positioning Management System" an electronic warning system, in particular to a wrist band positioning emitter used for a prisoner positioning management system, comprising a body, a wrist band and a wrist band fastener, wherein inside the body there are provided a control module, and a global positioning module, a wireless communication module and a power supply conversion module which are controlled by the control module, the global positioning module and the wireless communication module are connected with the control module through a serial port, inside the wrist band there is provided a conductive loop, one end of the conductive loop is connected with the high level interface of the control module, and the other end of the conductive loop is connected with the I/O port of the control module. The wrist band positioning emitter used for a prisoner positioning management system can effectively sense the damage on the wrist band from wearers and transits alarm information through arranging the conductive loop inside the wrist band, thereby enabling the prisoners not to privately take off or damage the wrist band electronic tag, and being convenient for prison managers to monitor prisoners.

Chinese Patent issued Aug. 19, 2015, for "Electronic Waist Strap System Oriented to Management and Control of Community Correction Personnel and Abnormal Detection Method Thereof" discloses a non-removable electronic waist strap system and an abnormal movement detection method thereof, particularly relates to an electronic waist strap system oriented to management and control of the community correction personnel and an abnormal detection method thereof, and belongs to the technical field of electronic waist straps. According to the technical scheme provided by the invention, the electronic waist strap system oriented to management and control of the community correction personnel comprises a non-removable electronic waist strap put on the correction personnel, wherein the non-removable electronic waist strap can be matched and connected with handheld equipment, and a number of non-removable electronic waist straps detected by the handheld equipment simultaneously exceeds a preset number, the handheld equipment is used for inputting personnel gathering and warning information and transmitting current GPS (Global Positioning System) position information. The electronic waist strap system is compact in structure, capable of realizing abnormal detection such as collection of the community correction personnel, damage and dismantling of a waist strap and short-time serious action, and no wearing of the waist strap, convenient to use, and safe and reliable.

Chinese Patent Publication published Oct. 10, 2012, for "Personnel Positioning and Monitoring System" discloses a personnel positioning and monitoring system which comprises a wrist strap with an RFID (Radio Frequency Identification) function, a mobile phone, a short message gateway, a background server and an operation terminal and is characterized in that the wrist strip with the RFID function is worn on monitored personnel; the monitored personnel is provided with a mobile telephone with an RFID-SIM (Subscriber Identity Module) card and controlled software; a law enforcement officer is provided with a mobile phone with control software; the wrist strap with the RFID function is matched with the mobile telephone with the RFID-SIM card and the controlled software and then is initialized with the corresponding mobile phone; the wrist strip is communicated with the corresponding mobile phone at a detection time interval set in an initialization parameter to detect whether the wrist strip is in a normal state, thereby realizing personnel positioning and monitoring.

Chinese Patent Publication published Jun. 6, 2015, for "Smart Wristband with Global Positioning and Authentication Functions" discloses a smart wristband with global positioning and authentication functions, comprising a wristband body, a central processing module, a memory module, a power supply module, a positioning module, a display module, a communication module and a fingerprint recognition module; the central processing module, the memory module, the power supply module, the positioning module, the display module, the communication module and the fingerprint recognition module are mounted on the wristband body. The positioning module acquires current positioning coordinates. The fingerprint recognition module acquires fingerprint information of a current user; the central processing module compares the fingerprint information with pre-stored fingerprint data to obtain a comparison result; the central processing module transmits the current positioning coordinates and the comparison result to the display module for displaying and sends out them through the communication module. The memory module is connected with the central processing module. The power supply module is connected with the central processing module. The smart wristband is capable of locating a current position of the user in real time and authenticating the identity of the user anytime and is capable of comprehensively monitoring health conditions of the user.

European Patent Specification published Sep. 24, 2014, by Bryan for "System for Tracking an Asset" discloses a system enabling communication between a base station and a tracking device such that, in the event that any specified condition is met, i.e., tampering with the tracking device, removal of the device from the asset to be tracked, movement of the tracking device outside a predetermined location or area, triggers communication with the base station or, in the alternative, with an outside third party, in order to raise an alert. In addition, the base station with the two-way communication permits greater control of the tracking device and its components, leading to optimization of the power requirements of each component and, as a result, a longer period of use of the device before the power is exhausted.

Additionally, a modern smartwatch can be used as an offender location monitoring device, but the use in such an application is limited because of the smartwatch's lack of tamper and removal prevention and detection features. This limitation could be addressed by developing a custom or specialized smartwatch that has such features, but this is unlikely to happen because the offender location monitoring market is very small and likely does not have the revenue potential required for smartwatch manufacturers to justify such a product. Offender location monitoring companies could certainly attempt such a development project, but the technical resources and expertise required to develop and manufacture such a small, technology-rich product are probably beyond the means of most small companies. What is needed in the marketplace is a way to adapt tamper and removal prevention and detection features to commercially available smartwatches as-purchased, without having to physically alter the smartwatches. Such an approach would also have economic benefits to the market, as smartwatch manufacturers can manufacture their devices at a fraction of the cost of offender location monitoring companies due to great economies of scale. Some of today's smartwatches already have non-discounted retail prices lower than ankle bracelet cost-of-goods-sold, and these retail prices will continue to go down. In addition, the large volume consumer market affords smartwatch manufacturers access to the latest technologies and research and development budgets that are orders of magnitude greater than those of location monitoring companies. Therefore, using smartwatches for offender location monitoring will lead to ongoing improvements in performance, accuracy, and quality.

BRIEF SUMMARY OF THE INVENTION

An embodiment of the present invention is a wearable computer capable of removal detection comprising a security strap; wherein the security strap contains a microcontroller and a conductor, is wearable on a wrist of an offender, and which security strap is attached to a smartwatch; a programmable smartwatch; a security strap transmitter in communication with the smartwatch; a security strap receiver in communication with the smartwatch; and a security strap battery within the security strap to power the security strap; wherein the microcontroller is programmed to monitor an electrical signal of the conductor; further wherein if the electrical signal of the conductor is interrupted, then the microcontroller is programmed to notify the smartwatch of the same via the transmitter and the receiver; and further wherein the smartwatch is programmed to notify a supervising authority or monitoring personnel of the interrupted electrical signal.

Another embodiment of the present invention is a wearable computer capable of removal detection comprising a security strap; wherein the security strap contains an RFID tag and is wearable on a wrist of an offender, which security strap is attached to a smartwatch; a programmable smartwatch; and a security strap battery within the security strap to power the security strap; wherein the smartwatch is programmed to interrogate the RFID tag at periodic intervals for an identification sequence transmission; and further wherein if the RFID tag transmission is interrupted, then the smartwatch is programmed to notify a supervising authority or monitoring personnel of the interrupted transmission.

Yet another embodiment of the present invention is a wearable computer capable of removal detection comprising an implantable RFID tag; wherein the RFID tag is implanted in a hand of an offender, which RFID tag is in communication with a smartwatch; and a programmable smartwatch; wherein the smartwatch is programmed to interrogate the RFID tag at periodic intervals for an identification sequence transmission; and further wherein if the RFID tag transmission is interrupted, then the smartwatch is programmed to notify a supervising authority or monitoring personnel of the interrupted transmission.

A method of the present invention is removal detection of a wearable computer comprising the steps of providing a programmable smartwatch attached to a security strap that contains a microcontroller, a conductor, a transmitter and a receiver, which security strap is wearable on a wrist of an offender, and which security strap is attached to the smartwatch and the transmitter and the receiver are in communication with the smartwatch; attaching the smartwatch to an offender with the security strap; monitoring an electrical signal of the conductor; transmitting a status of the electrical signal of the conductor between the security strap and smartwatch; receiving a status of the electrical signal of the conductor between the security strap and smartwatch; and notifying a supervising authority or monitoring personnel by the smartwatch of the status of the electrical signal.

Another method of the present invention is removal detection of a wearable computer comprising the steps of providing a programmable smartwatch attached to a security strap that contains an RFID tag, which RFID tag is in communication with a smartwatch, which security strap is wearable on a wrist of an offender, and which security strap is attached to the smartwatch; attaching the smartwatch to an offender with the security strap; interrogating at periodic intervals by the smartwatch an identification sequence transmission of the RFID tag; and notifying a supervising authority or monitoring personnel by the smartwatch of the status of the transmission.

Yet another method of the present invention is removal detection of a wearable computer comprising the steps of providing an RFID tag implantable in a hand of an offender, which RFID tag is in communication with a smartwatch; providing a programmable smartwatch; attaching the smartwatch to an offender; interrogating at periodic intervals by the smartwatch an identification sequence transmission of the RFID tag; notifying a supervising authority or monitoring personnel by the smartwatch of the status of the transmission.

LIST OF REFERENCE NUMERALS

Figure 1:
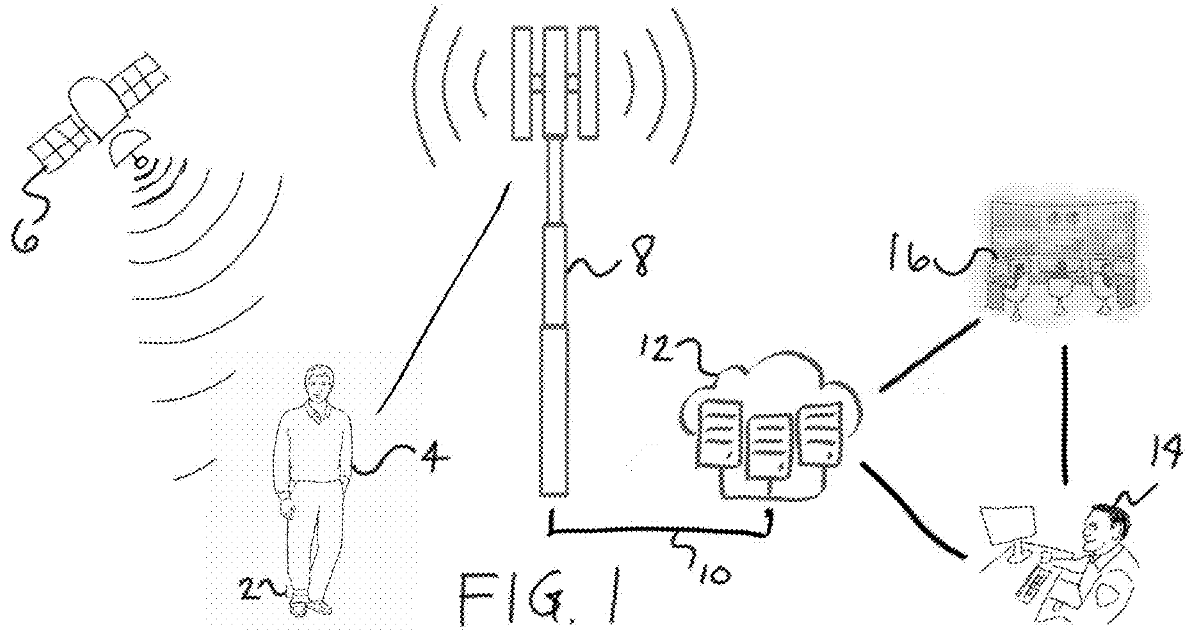
FIG. 1 is a diagram of an offender location monitoring system using an ankle bracelet monitoring device.

2 monitoring device
4 offender
6 GPS satellites
8 cellular tower
10 cellular network operator
12 central data center
14 supervising authority
16 monitoring personnel
20 housing
22 strap
24 computer microcontroller
26 GPS receiver
28 computer memory
30 cellular radio
32 wireless RF transmitter and receiver
34 WiFi transmitter and receiver
38 battery
40 battery charging and electrical power management circuitry
42 audible sound component
44 vibrating buzzer
46 button(s)
48 speaker
50 microphone
52 tamper and removal prevention and detection features and technologies
54 electrically conductive element(s) or optical fiber(s)
60 smartwatch
62 smartphone
64 smartwatch housing
66 smartwatch strap
70 security strap
72 security strap microcontroller
74 security strap transmitter and receiver
76 security strap battery
78 security strap conductor
80 security strap material
82 security strap clips
84 RFID tag
86 implanted RFID tag
90 waveform associated with transmission in air
92 waveform associated with transmission in close proximity to water

DETAILED DESCRIPTION OF THE INVENTION

Smartwatches are part of the general category of wearable devices. Any discussion herein relating to smartwatches is applicable to other wearable devices that may be worn on parts of the body other than the wrist, including the arm, leg, ankle, torso, and head. Yet other wearable devices are articles of clothing, such as shirts, vests, pants, glasses, gloves, and jackets, with technological components built into the clothing. These wearable devices could have similar components and functions as a smartwatch disclosed herein.

Offender location monitoring is part of the larger category of location monitoring. Any discussion herein relating to location monitoring is applicable to other applications such as tracking children, elderly, pets, livestock, vehicles, and cargo, or other movable lifeforms or objects.

Tamper and removal prevention and detection of offender location monitoring ankle bracelets is part of the general category of tamper and removal prevention and detection. Any discussion herein of tamper and removal prevention and detection of offender location monitoring ankle bracelets is applicable to other applications such as security, workplace, children, and elderly.

Embodiments described herein relate specifically to detecting attempts to remove, tamper with, or cut the strap of a smartwatch used for location monitoring of individuals.

Offender location tracking devices have evolved to a point where they are wearable computers. Modern smartwatches are also wearable computers and can be used as offender tracking devices but have the limitation of not being able to detect if they are being tampered with or are removed. A novel security band can be used in conjunction with a commercially available smartwatch. This security band detects if it is cut or removed and wirelessly notifies the smartwatch or optional smartphone. That notification is then relayed to a monitoring center or supervising authority using the cellular telephone network or other wireless communication method.

In one embodiment the security band consists of an electrical conductor, microcontroller, wireless receiver and transmitter, and battery. The microcontroller monitors an electrical signal on the conductor, and if that electrical signal is interrupted or altered then it is indicative of a 'cut strap' or 'open strap', and security strap transmitter and receiver notifies the smartwatch of this condition using a wireless communication protocol such as Bluetooth. The smartwatch then notifies a supervising authority or monitoring personnel of the event using cellular or another form of wireless communication. In another embodiment, the smartwatch transmits notification to a smartphone, which then notifies a supervising authority or monitoring personnel of the event using cellular or another form of wireless communication.

In another embodiment the security strap contains an RFID tag in place of the conductor and receiver or transmitter. The smartwatch interrogates the RFID tag at periodic time intervals. When the RFID tag is in close physical proximity such as around the wrist it will respond by transmitting an identification sequence or other pre-programmed information or message. If the security strap containing the RFID tag is removed and not in close proximity it will not transmit the identification sequence, so the smartwatch interprets this lack of transmission as a 'cut strap' or 'open strap'. A supervising authority or monitoring personnel is then notified using the communication methods described above.

Referring now to the Figures, in which like reference numerals refer to structurally and/or functionally similar elements thereof, FIG. 1 shows an embodiment of an offender monitoring system. Monitoring device 2 is attached to offender 4. Monitoring device 2 continuously receives signals from GPS satellites 6 and periodically processes those signals into geographic location points usually consisting of latitude, longitude, and other parameters. Location points and other relevant data from the monitoring device 2 are then periodically transmitted to the nearest cellular tower 8, relayed to the cellular network operator 10, and then relayed to a central data center 12. The supervising authority 14 and monitoring personnel 16 can then access the data points and other data using a computer software program. An offender 4 is a criminal offender in this embodiment, but could be any type of person, animal, or object in other embodiments, such as children, elderly, patients, pets, livestock, vehicles, or cargo, or other movable lifeform or object. The term GPS is used as a generic term to refer to any of the satellite systems used worldwide including GPS, GLONASS, BDS, and Galileo. Although only one satellite is shown in the Figures, numerous satellites 6 must actually be in the field of view of monitoring device 2 to process a location point. GPS satellites 6 are the most common method of location tracking, but in other embodiments could be replaced by or supplemented with other location tracking technologies including cellular tower triangulation, WiFi-based positioning systems, cellular ID, and IP address.

In other embodiments, a hybrid approach using multiple location tracking technologies and satellite systems is used, either simultaneously, or at different times. The time intervals at which a monitoring device 2 processes GPS signals into geographic location points and transmits those points to nearest cellular tower 8 may be the same or different from each other. Although the cellular network and cellular network operator 10 is referred to as a single entity, in many embodiments this is multiple networks and multiple operators working in conjunction to provide data communication services.

In another embodiment, transmission of data from the monitoring device 2 to a central data center 12 could eliminate a cellular tower 8 and the cellular network operator 10 and be done by any of numerous communication technologies including WiFi, Bluetooth, WiMax, or Zigbee; or a hybrid approach that uses different data communication methods at different times could be used. The central data center 12 consists of one or more pieces of hardware, software, and databases. These may be housed at a single location or distributed across multiple locations, multiple pieces of hardware, multiple pieces of software, and multiple databases. In this embodiment, a supervising authority 14 is a probation department or corrections electronic monitoring personnel, but in other embodiments could be any people with an interest in knowing the location of the tracked person, lifeform, object or item. In this embodiment monitoring personnel 16 are shown as a separate entity whose role is to monitor the location of an offender 4 and relay relevant information to a supervising authority 14, but in other embodiments these functions are combined.

Figure 2:
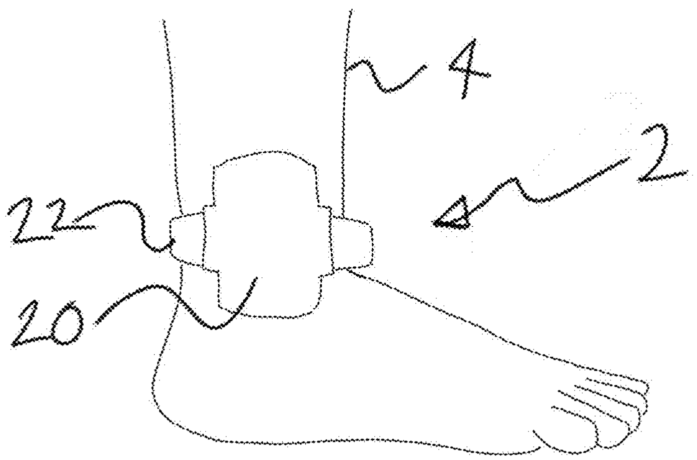
FIG. 2 is a plan view of an ankle monitoring device as worn by an offender.

Referring now to FIG. 2, the monitoring device 2 consists of a housing 20 and a strap 22. The housing 20 is an enclosure that contains components required for the monitoring device 2 to perform its functions as a location tracking device. The housing 20 is water resistant and ruggedized to withstand usage over an extended period of time in numerous environments. A strap 22 is physically attached to the housing 20 and secures the housing 20 to the offender 4. The housing 20 and the strap 22 are usually jointly designed in a way that any fastening hardware and connection features are inaccessible to the offender 4 after installation is complete. The strap 22 can be very strong or thick so it is nearly impossible to cut through using common household tools. The strap 22 is a single physical unit attached to the housing 20 at each of its ends, but in other embodiments is two or more separate components joined together then attached to the housing 20 at one or more locations. The strap 22 may be of fixed or adjustable length. The strap 22 also contains one or more electrically conductive elements, or one or more optical fibers, that are used for tamper and removal detection. The monitoring device 2 is shown attached to a leg, above an ankle of an offender 4, but the monitoring device 2 could be attached to any part of the offender's body, or even not attached to the body at all, but rather carried by the offender 4.

Figure 3:
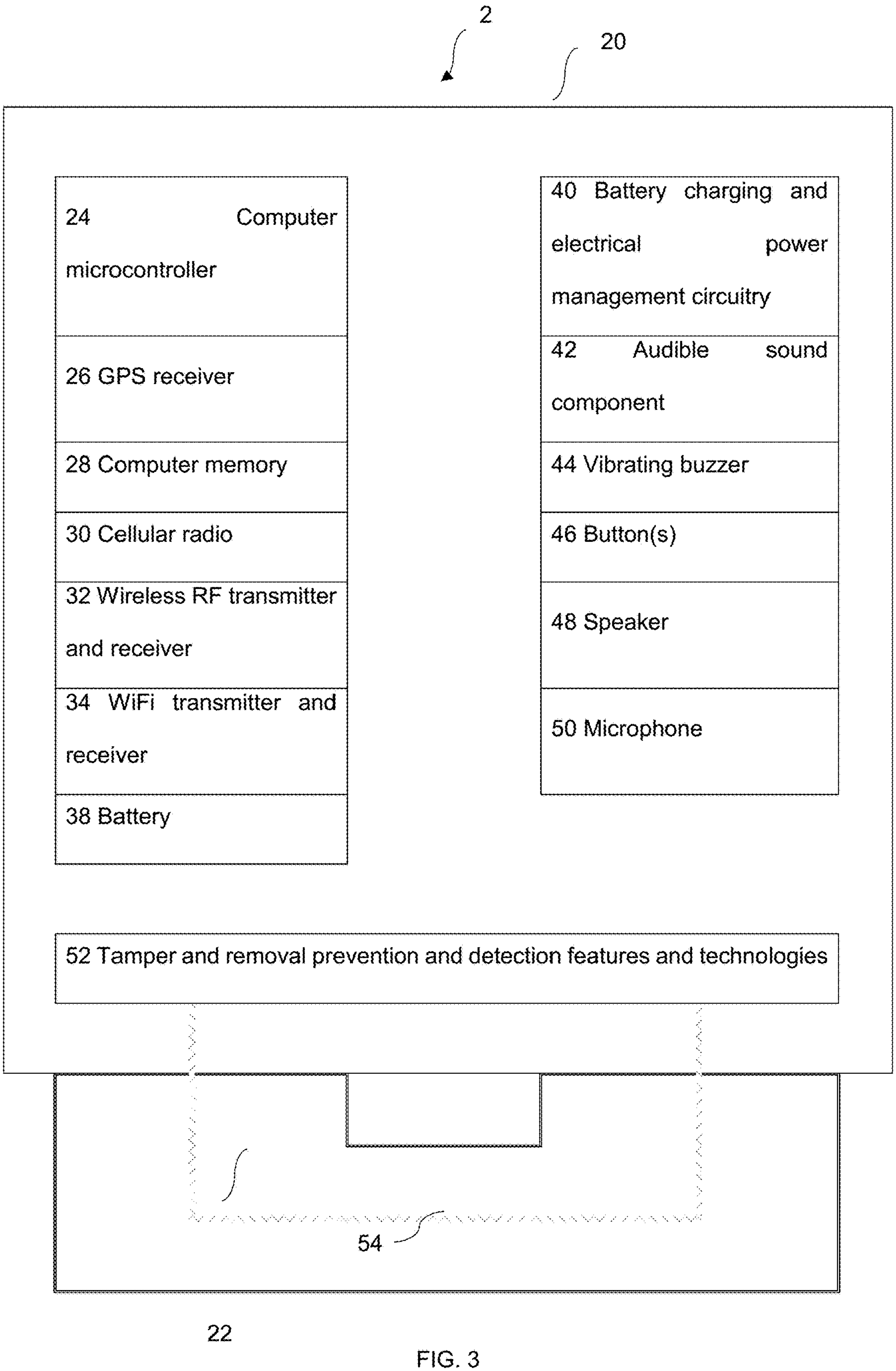
FIG. 3 is a diagram of major, functional components of a monitoring device of the present invention.

FIG. 3 is a block diagram showing the major functional components of an offender monitoring device 2, most of which are housed within the housing 20. FIG. 3 is not intended to be an engineering schematic, as a person skilled in the art will understand that numerous functional components may be combined into a single computer chip or module, sometimes referred to as a system-on-chip (SOC) or multi-chip module (MCM). Some embodiments may not contain all of these functional components, while other embodiments may contain additional functional components not shown in FIG. 3.

The components in the housing 20 combine to form a wearable computer. A computer microcontroller 24 contains an embedded software program to control overall function of the monitoring device 2. A GPS receiver 26 has its own antenna to receive signals from GPS satellites 6 and processes those signals into location points. Computer memory 28 is used to store embedded software, operating instructions, device configuration, location points, and other data. The computer memory 28 may be volatile or non-volatile, or a combination of both. Although shown as a single functional component, computer memory 28 may be distributed across numerous physical components such as memory chips, a computer microcontroller 24, and a cellular radio 30. The cellular radio 30 is used to transmit location points and other data to the cellular tower 8 and consists of one or more cellular radio transmitters, receivers, and antennas. The cellular radio 30 may also have built in memory, processing, and power management functions and is often referred to as a cellular modem or cellular chip. A wireless RF transmitter and receiver 32 has an antenna and is used to communicate with a traditional house-arrest base-station for compatibility with older systems or for use when GPS signals or other location tracking methods are not available. A WiFi transmitter and receiver 34 has an antenna and can be used to transmit location point and other data instead of using the cellular radio. The WiFi transmitter and receiver 34 can also be used to supplement or replace location tracking technology by using a WiFi based location.

A battery 38 provides power to the monitoring device 2 and is usually a rechargeable type, but it does not have to be. Battery charging and electrical power management circuitry 40 regulate the battery charging function and monitor the battery discharging function to provide meaningful information about battery state to an end user.

An audible sound component 42 such as a bell, beeper, or buzzer is used to provide audible tones to the offender 4 for scenarios which require notification or feedback. A vibrating buzzer 44 has similar function as the audible sound component 42 but provides the feedback in haptic manner. In this embodiment the monitoring device 2 contains one or more buttons 46 which allow the offender 4 to silence the monitoring device 2 or to provide acknowledgement or feedback to monitoring personnel 16 or supervising authority 14. In this embodiment the monitoring device 2 contains a speaker 48 and a microphone 50 that allow monitoring personnel 16 or supervising authority 14 to converse with the offender 4, or to send verbal messages that are more complex than an audible tone or beep.

With continuing reference to FIG. 3, the monitoring device 2 also contains one or more features and technologies used for tamper and removal prevention and detection 52. The most common feature for detecting removal of the monitoring device 2 from the offender 4 is to be able to detect if the strap 22 has been cut. This is done by embedding one or more electrically conductive elements or optical fibers 54 into the strap 22. The electrically conductive elements or optical fibers 54 are physically connected to or pass through the housing 20 where they connect to circuitry or components contained within the housing 20. Although there are numerous ways to implement this technology electrically and mechanically, in its simplest form an electrical signal is applied to one end of the electrically conductive element and monitored at the other end. If the strap 22 is cut or pulled from its connection to the housing 20, the electrical signal is interrupted or altered, and that change in signal triggers the monitoring device 2 to notify supervising authority 14 or monitoring personnel 16 of a ‘cut strap’ or ‘open strap’ event via wireless or cellular communication. The electrically conductive element 54 can be comprised of a single or multiple wires, flexible circuits, non-conductive materials with electrically conductive material printed or otherwise adhered to them, or any type of physical elements capable of conducting an electrical current. The electrically conductive elements 54 are connected to or pass through the housing 20 at a single location or more than one location. Many implementations of this technology replace the electrically conductive element with an optical fiber, which is less prone to being stretched and nearly impossible to circumvent by ‘jumpering’ or ‘hot-wiring’. If the strap 22 is cut or pulled from its connection to the housing 20, then the optical signal is interrupted or altered, and that change in signal triggers the monitoring device 2 to notify supervising authority 14 or monitoring personnel 16 of a ‘cut strap’ or ‘open strap’ event via wireless or cellular communication. The optical fiber can be comprised of a single fiber-optic element or multiple elements.

In some embodiments, optical sensing is another feature and technology used for tamper and removal prevention and detection 52. With optical sensing, a beam of light is emitted from the housing 20 then reflected off the leg of the offender 4. The reflected light is detected by a receiver. If the reflected light is not present or its characteristics fall outside of certain parameters, it is indicative of a leg no longer being present and therefore of a bracelet removal. In some embodiments an optical sensor is placed in a manner to reflect off the inner portion of the housing 20 or a component internal to the housing 20. In another embodiment an optical sensor is placed inside the housing 20 in a receive-only mode and triggers when any light is present in the normally dark environment inside the housing 20. These arrangements are used to detect a ‘case breach’ or ‘housing breach’ meaning part of the housing 20 has been removed, cut open, or otherwise mutilated. Optical sensing may use either visible or infrared (IR) light frequencies. Other features and technologies used for tamper and removal prevention and detection 54 are measuring the electrical capacitance of the leg, leg or body temperature, electrodermal activity (such as skin conductance and galvanic skin response (GSR)), photoplethysmography (PPG) or pulse oximetry sensors, and even electrocardiography (ECG) signatures.

Figure 4:
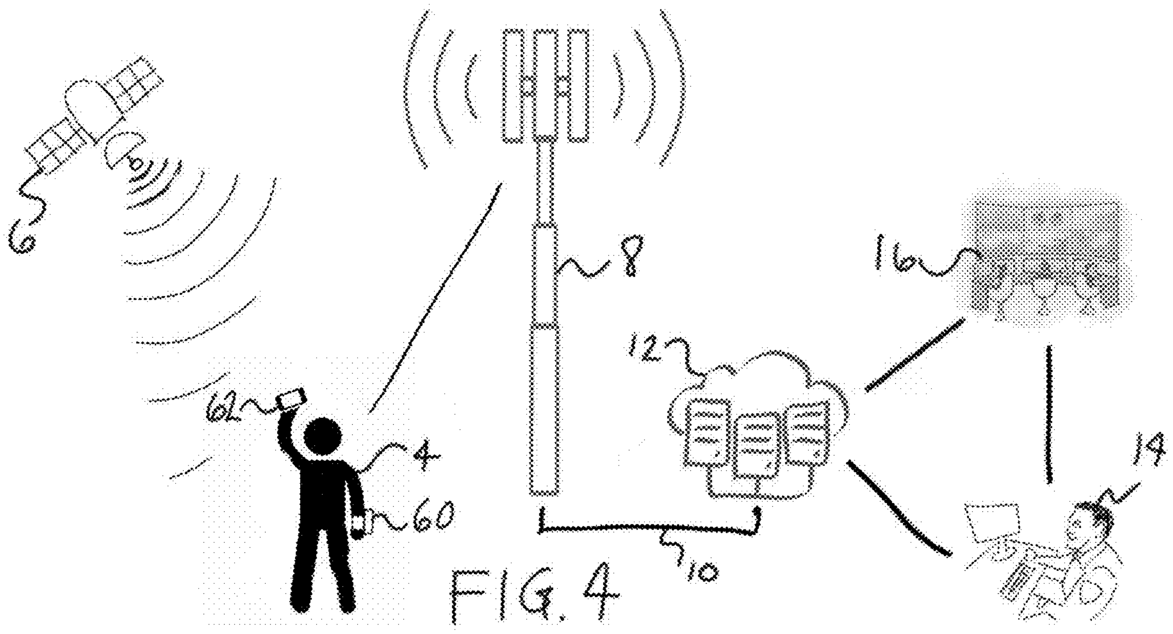
FIG. 4 is a diagram of an offender location monitoring system using a smartwatch and an optional smartphone as worn and used by an offender.

Referring now to FIG. 4, it shows an embodiment of an offender monitoring system in which the monitoring device 2 is no longer present but has been replaced by a smartwatch 60 and an optional smartphone 62. The smartwatch 60 continuously receives signals from GPS satellites 6 and periodically processes those signals into geographic location points usually consisting of latitude, longitude, and other parameters. Location points and other relevant data from the smartwatch 60 are then periodically transmitted to the nearest cellular tower 8, relayed to a cellular network operator 10, and then relayed to a central data center 12. A supervising authority 14 and monitoring personnel 16 can then access the data points and other data using a computer software program. The offender 4 is a criminal offender in this embodiment, but could be any type of person, animal, or object in other embodiments, such as children, elderly, patients, pets, livestock, vehicles, or cargo, or other movable lifeform or object. The term GPS is used as a generic term to refer to any of the satellite systems used worldwide including GPS, GLONASS, BDS, and Galileo. Although only one satellite is shown in FIG. 4, numerous satellites 6 must actually be in the field of view of the smartwatch 60 to process a location point. GPS satellites 6 are the most common method of location tracking, but in other embodiments could be replaced by or supplemented with other location tracking technologies including cellular tower triangulation, WiFi-based positioning systems, cellular ID, and IP address. In other embodiments, a hybrid approach using multiple location tracking technologies and satellite systems is used, either simultaneously, or at different times. The time intervals at which the smartwatch 60 processes GPS signals into geographic location points and transmits those points to a nearest cellular tower 8 may be the same or different from each other. Although the cellular network and the cellular network operator 10 is referred to as a single entity, in many embodiments this is multiple networks and multiple operators working in conjunction to provide data communication services.

In another embodiment, transmission of data from the smartwatch 60 to central data center 12 could eliminate the cellular tower 8 and the cellular network operator 10 and be done by any of numerous communication technologies including WiFi, Bluetooth, WiMax, or Zigbee; or a hybrid approach that uses different data communication methods at different times. In another embodiment location points and other data are periodically transmitted from the smartwatch 60 to the smartphone 62, and the smartphone 62 periodically transmits that data to the nearest cellular tower 8. From there it is relayed to the cellular network operator 10, and then relayed to a central data center 12.

In yet another embodiment location points and other data are periodically transmitted from the smartwatch 60 to the smartphone 62, but the cellular tower 8 and cellular network operator 10 are eliminated and data is sent from the smartphone 62 to the central data center 12 using any of numerous communication technologies including WiFi, Bluetooth, WiMax, or Zigbee; or a hybrid approach that uses different data communication methods at different times. In another embodiment, the smartwatch 60 could send non-processed signals to the smartphone 62 and the smartphone 62 processes those signals into geographic location points usually consisting of latitude, longitude, and other parameters. In yet another embodiment, the smartphone 62 continuously receives signals from GPS satellites 6 and periodically processes those signals. The smartwatch 60 is in communication with the smartphone 62, but merely acts as a tether identifying the offender 4 so that a monitoring agency knows the location points from the smartphone 62 are in close proximity to the smartwatch 60. The central data center 12 consists of one or more pieces of hardware, software, and databases. These can be housed at a single location or distributed across multiple locations, multiple pieces of hardware, multiple pieces of software, and multiple databases. In this embodiment, the supervising authority 14 is a probation department or corrections electronic monitoring personnel, but in other embodiments could be any people with an interest in knowing the location of the tracked person or item. In this embodiment monitoring personnel 16 are shown as a separate entity whose role is to monitor the location of the offender 4 and relay relevant information to the supervising authority 14, but in other embodiments these functions are be combined.

Figure 5:
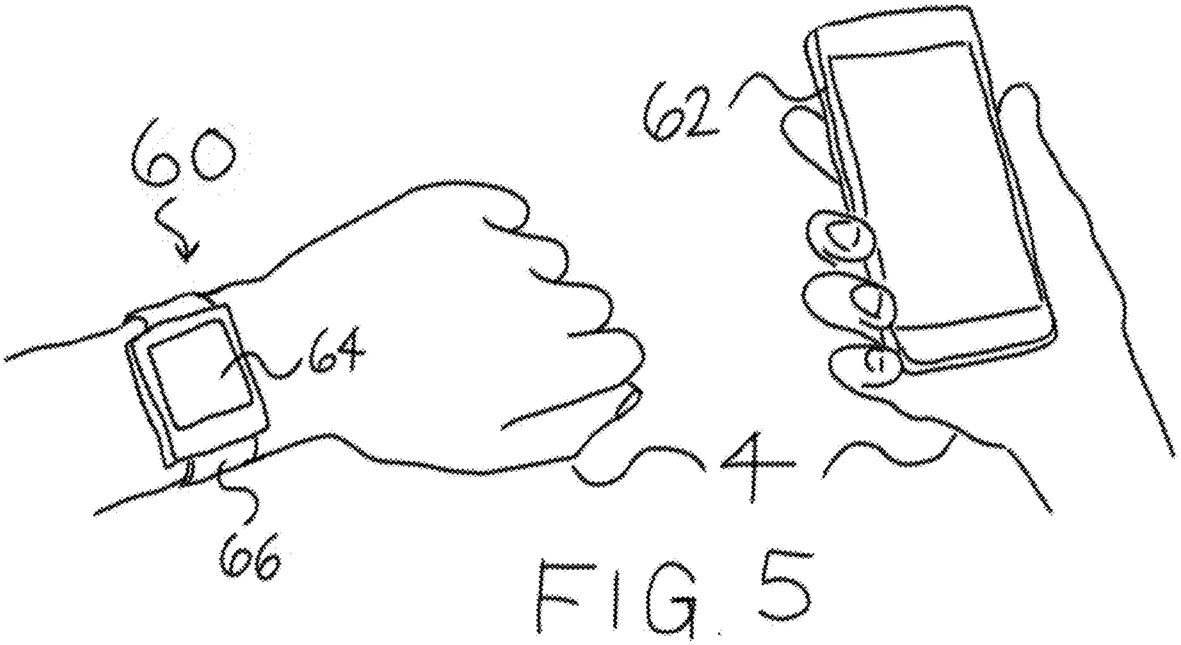
FIG. 5 is a plan view of a smartwatch and an optional smartphone.

Referring now to FIG. 5, a smartwatch 60 is a wearable computer shown attached to the wrist of an offender 4, but the smartwatch 60 could be attached to any part of the offender's body. A smartwatch strap 66 is physically attached to a smartwatch housing 64 and secures the smartwatch 60 to the offender 4. The smartwatch 60 has most of the same functions as a monitoring device 2. The smartwatch housing 64 contains the functional components of the smartwatch 60 and is water resistant and ruggedized to withstand usage over an extended period of time in numerous environments. The smartwatch housing 64 contains a computer microcontroller, a GPS receiver with its own antenna, computer memory, a WiFi transmitter and receiver with its own antenna, a battery, and battery charging and electrical power management circuitry. It also contains one or more audible sound components, vibrating buzzer, speaker, microphone, and one or more buttons or features that have equivalent function to a button. In this embodiment, the smartwatch housing 64 contains a cellular radio with antenna to send and receive data to and from various computer networks. In other embodiments, the smartwatch housing 64 does not contain a cellular radio, but wirelessly communicates with a smartphone 62 using WiFi, Bluetooth, or any number of wireless communication methods. The smartwatch housing 64 also has several functional components that the monitoring device 2 does not have, including a display or touchscreen, a Bluetooth radio and antenna used to transmit and receive data to and from other devices such as the smartphone 62, and a radio frequency identification (RFID) and/or near-field communication (NFC) function used to read encoded data sources that are in close proximity. The housing 64 also has the ability to receive numerous computer software programs (apps) that perform numerous functions. The smartwatch housing 64 does not have a wireless RF transmitter and receiver that is compatible with traditional house-arrest base-stations. Unlike the housing 20 and the strap 22, the smartwatch housing 64 and the smartwatch strap 66 are not designed in a way to prevent removal of the smartwatch 60 from the offender 4, and the smartwatch housing 64 has no features or technology that are used for tamper and removal detection. The smartwatch strap 66 has no electrically conductive elements or optical fibers and has only simple mechanical fastening to the smartwatch housing 64 with no electrical or optical connections that connect to or pass through the smartwatch housing 64. This is a major limitation of the offender location monitoring systems using a smartwatch and optional smartphone that are shown in FIG. 4 and FIG. 5.

Figure 6:
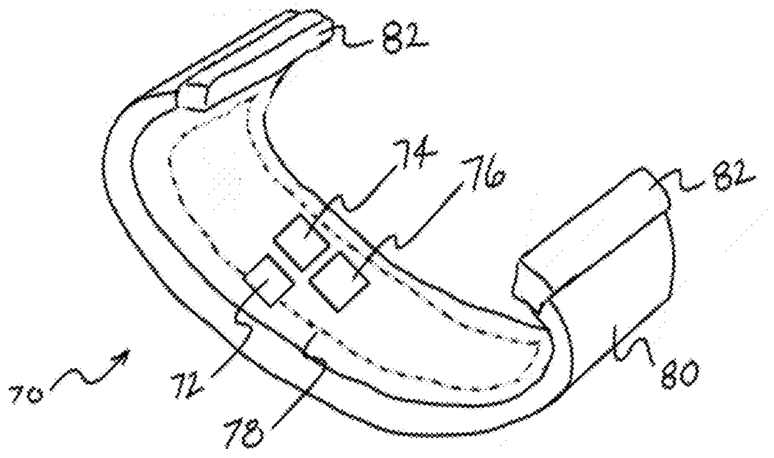
FIG. 6 is a perspective view of a first embodiment of a security strap of the present invention.

FIG. 6 shows an embodiment of the present invention for a security strap 70 that is used in place of the smartwatch strap 66. The security strap 70 gets attached to the smartwatch 60, which is then worn on a wrist of an offender 4. Other embodiments can use the security strap 70 to fasten the smartwatch 60 to any part of a body, or to children, elderly, pets, livestock, vehicles, or cargo, or other movable lifeforms or objects. The security strap 70 contains a security strap microcontroller 72 and a security strap conductor 78. The microcontroller 72 is programmed to monitor an electrical signal on a conductor 78. If that electrical signal is interrupted or altered, then it is indicative of a 'cut strap' or 'open strap,' and a security strap transmitter and receiver 74 notifies the smartwatch 60 of this condition using a wireless communication protocol such as Bluetooth. The smartwatch 60 then notifies the supervising authority 14, or monitoring personnel 16 of a 'cut strap' or 'open strap' event via wireless or cellular communication. In another embodiment, notification from the smartwatch 60 to a central data center 12 could eliminate the cellular tower 8 and the cellular network operator 10 and be done by any of numerous communication technologies including WiFi, Bluetooth, WiMax, or Zigbee; or a hybrid approach that uses different data communication methods at different times.

In another embodiment, notification is transmitted from the smartwatch 60 to the smartphone 62, and the smartphone 62 transmits that notification to the nearest cellular tower 8. From there it is relayed to the cellular network operator 10, and then relayed to a central data center 12. In yet another embodiment notification is transmitted from the smartwatch 60 to the smartphone 62, but the cellular tower 8 and the cellular network operator 10 are eliminated and notification is sent from the smartphone 62 to the central data center 12 using any of numerous communication technologies including WiFi, Bluetooth, WiMax, or Zigbee; or a hybrid approach that uses different data communication methods at different times. Notifications of 'cut strap' or 'open strap' may be transmitted by the security strap transmitter and receiver 74 using any of a variety of logical arrangements. In one arrangement, the smartwatch 60 receiver is always listening and the security strap transmitter and receiver 74 transmits notification of an 'open strap' or 'cut strap' at the time or in close time proximity of the actual event occurrence. In another logical arrangement, the smartwatch 60 receiver is always listening and the security strap transmitter and receiver 74 periodically transmits notification that all-is-well until an 'open strap' or 'cut strap' occurs. It then stops transmitting the all-is-well notification and the smartwatch 60 interprets this lack of all-is-well notification as a 'cut strap' or 'open strap.' In yet another logical arrangement, the security strap transmitter and receiver 74 transmits information to the smartwatch 60 only when queried by the smartwatch 60.

The security strap microcontroller 72 and the transmitter and receiver 74 may be separate electronic components or may be part of a single chipset, SoC, or MCM. The electrical signal on the security strap conductor 78 may be supplied by the microcontroller 72 or directly from the security strap battery 76. The electrical signal may be a constant voltage or wave-form of varying voltage levels. The security strap battery 76 is also used to the power microcontroller 72 and the transmitter and receiver 74. The security strap conductor 78 can be comprised of a single wire or multiple wires, flexible circuits, non-conductive materials with electrically conductive material printed or otherwise adhered to them, or any type of physical elements capable of conducting an electrical current. The security strap material 80 may be a single material or a combination of different materials joined together. The security strap material 80 may be flexible to wrap around the wrist, or rigid and pre-formed to conform to the wearer's wrist. The security strap material 80 may fully enclose the security strap circuitry, such as with over-molding a plastic or rubber material or laminating materials on the top and bottom sides of circuitry. Security strap clips 82 fasten overall the security strap 70 to the smartwatch 60. They may be purely mechanical in function or may have electrically conductive components that complete the circuit of conductor 78 when fastened, thereby opening the circuit if removed resulting in a 'cut strap' or 'open strap' notification.

Figure 7:
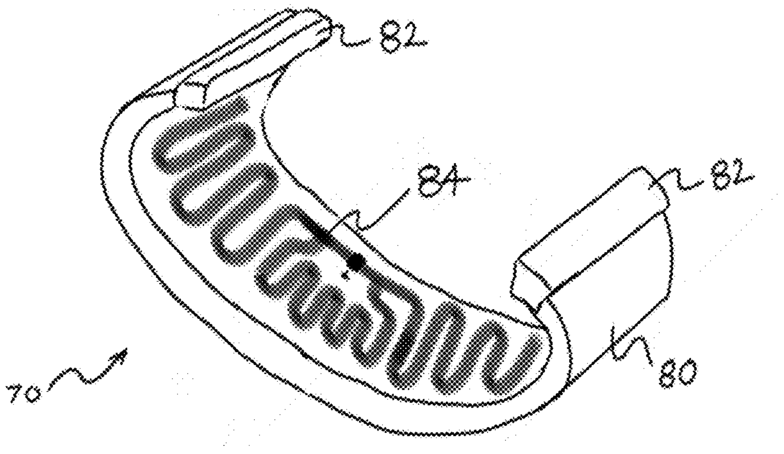
FIG. 7 is a perspective view of a second embodiment of a security strap of the present invention.

FIG. 7 shows an embodiment of the present invention that uses an RFID tag the in security strap 70. This eliminates the security strap microcontroller 72, the security strap transmitter and receiver 74, and the security strap conductor 78. Depending on the type of RFID tag chosen, it may also eliminate the need for the security strap battery 76. In this embodiment the RFID tag 84 acts as both the conductor and receiver or transmitter. The smartwatch 60 interrogates or attempts to read the RFID tag 84 at periodic time intervals. When the RFID tag 84 is in close physical proximity such as around the wrist of the offender 4 it will respond by transmitting an identification sequence or other pre-programmed information or message. If the security strap 70 containing the RFID tag 84 is removed and not in close proximity, then it will not transmit the identification sequence, so the smartwatch 60 interprets this lack of transmission as a 'cut strap' or 'open strap.' If the security strap 70 and the RFID tag 84 are cut in a way that damages the RFID tag 84, then the RFID tag 84 will not function properly and not transmit the identification sequence, so the smartwatch 60 interprets this lack of transmission as a 'cut strap' or 'open strap.' The RFID tag 84 can have numerous physical configurations, but geometrically long configurations that take up most or all of the strap material length, such as 'dog-bone,' 'squiggle,' or 'dipole' configurations, are most logical as this will damage the RFID tag 84 anywhere the strap is cut.

Figure 8:
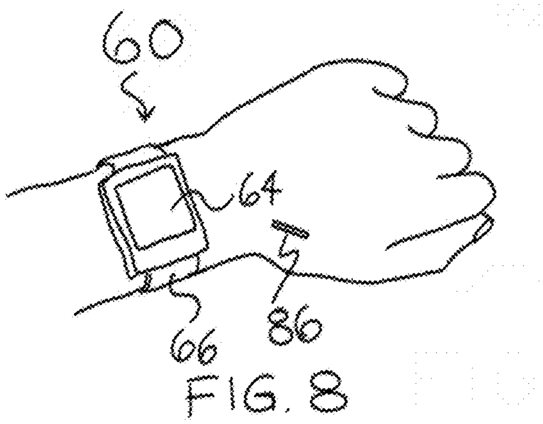
FIG. 8 is a plan view of the present invention using an RFID tag implanted into the hand of an offender.

FIG. 8 shows an embodiment of the present invention that uses an implanted RFID tag 86 that is implanted in a hand of the offender 4. This embodiment eliminates the need for the security strap 70 altogether and allows use of a standard smartwatch strap 66. The implanted RFID tag 86 is encoded with a unique identifier and implanted into the offender 4 at a location near a wrist. The smartwatch 60 interrogates or attempts to read the implanted RFID tag 86 at periodic time intervals. When the implanted RFID tag 86 is in close physical proximity to the smartwatch 60, then the RFID tag 86 will respond by transmitting its unique identifier. If the smartwatch 60 is not in proximity to the implanted RFID tag 86, then the RFID tag 86 will not transmit the unique identifier, so the smartwatch 60 interprets this lack of transmission as a 'smartwatch removed' event.

Figure 9:
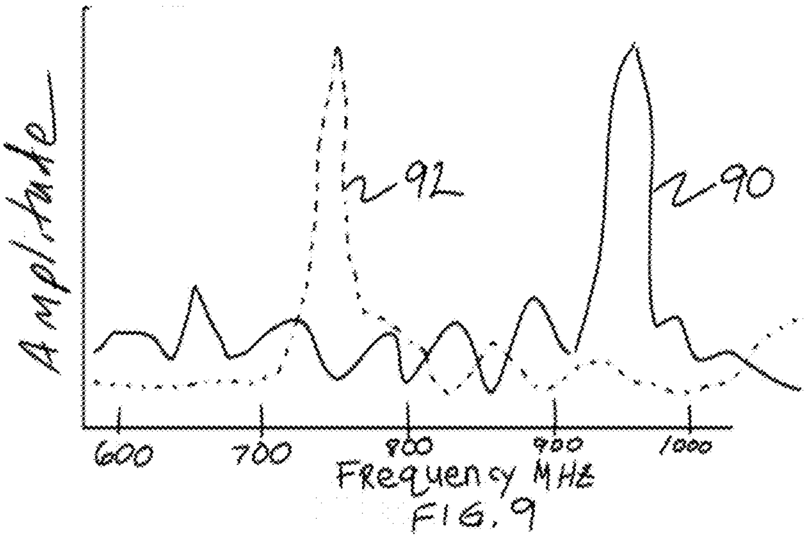
FIG. 9 is a graph example of an RFID waveform associated with transmission in air 90 and another waveform associated with transmission in close proximity to water 92.

FIG. 9 shows an embodiment of the present invention that uses wireless signal properties as a method for determining if the smartwatch 60 is still attached to the wrist of the offender 4. This embodiment requires the security strap 70 configured as shown in FIG. 6 or FIG. 7 and could be used in conjunction or in place of those embodiments. Placing the antennas of the transmitter and receiver 74 or the RFID tag 84 in close proximity to the body causes an electromagnetic coupling effect that distorts the transmitted waveform compared to when there is no human body present. This distorted waveform has a different peak frequency and amplitude. For example, RFID technology is designed to have an optimum response frequency of 950 MHz when transmitting in air, but when transmitting in close proximity to human tissue, which is largely comprised of water, the optimum response frequency will shift to about 720 MHz. FIG. 9 shows an example of an RFID waveform associated with transmitting in air 90 and another waveform associated with transmitting in close proximity to water 92. The smartwatch 60 can monitor the analog properties of the wireless waveform transmitted by the transmitter and receiver 74 or the RFID tag 84 and determine if a frequency shift or other change in in properties has occurred. A change in properties is interpreted as a 'smartwatch removed' event.

Unless defined otherwise, all technical and scientific terms used herein have the same meaning as commonly understood by one of ordinary skill in the art to which this invention belongs. Although any methods and materials similar or equivalent to those described herein also can be used in the practice or testing of the present invention, the preferred methods and materials are now described. The present invention has been described with reference to specific embodiments; however, it is understood that modifications and variations of the present invention are possible without departing from the scope of the invention, which is defined by the claims set forth below.

The invention claimed is:

1. A wearable computer capable of removal detection comprising:

a. a security strap; wherein the security strap contains a microcontroller and a conductor, is wearable on a wrist of an offender, and which security strap is attached to a smartwatch;

b. a programmable smartwatch;

c. a security strap transmitter in communication with the smartwatch; and d. a security strap battery within the security strap to power the security strap;

wherein the microcontroller is programmed to monitor an electrical signal of the conductor;

further wherein if the electrical signal of the conductor is interrupted, then the microcontroller is programmed to notify the smartwatch of the same via the transmitter; and further wherein the smartwatch is programmed to notify a supervising authority or monitoring personnel of the interrupted electrical signal.

2. The wearable computer as claimed in claim 1 further wherein the smartwatch is water resistant.

3. The wearable computer as claimed in claim 1 further wherein the smartwatch is ruggedized to withstand usage over an extended period of time in numerous environments.

4. The wearable computer as claimed in claim 1 further wherein the smartwatch comprises an audible sound component to provide audible notification to the offender.

5. The wearable computer as claimed in claim 1 further wherein the smartwatch comprises a vibrating buzzer to provide haptic notification to the offender.

6. The wearable computer as claimed in claim 1 further wherein the smartwatch comprises a speaker and a microphone to allow a supervising authority or monitoring personnel to converse with the offender.

7. A wearable computer capable of removal detection comprising:

a. a security strap; wherein the security strap contains an RFID tag and is wearable on a wrist of an offender, which security strap is attached to a smartwatch;

b. a programmable smartwatch; and c. a security strap battery within the security strap to power the security strap;

wherein the smartwatch is programmed to interrogate the RFID tag at periodic intervals for an identification sequence transmission; and further wherein if the RFID tag transmission is interrupted, then the smartwatch is programmed to notify a supervising authority or monitoring personnel of the interrupted transmission.

8. The wearable computer as claimed in claim 7 further wherein the smartwatch is water resistant.

9. The wearable computer as claimed in claim 7 further wherein the smartwatch is ruggedized to withstand usage over an extended period of time in numerous environments.

10. The wearable computer as claimed in claim 7 further wherein the smartwatch comprises an audible sound component to provide audible notification to the offender.

11. The wearable computer as claimed in claim 7 further wherein the smartwatch comprises a vibrating buzzer to provide haptic notification to the offender.

12. The wearable computer as claimed in claim 7 further wherein the smartwatch comprises a speaker and a microphone to allow a supervising authority or monitoring personnel to converse with the offender.

13. A method of removal detection of a wearable computer comprising the steps of:

a. providing a programmable smartwatch attached to a security strap that contains a microcontroller, a conductor, and a transmitter, which security strap is wearable on a wrist of an offender, and which security strap is attached to the smartwatch and the transmitter is in communication with the smartwatch;

b. attaching the smartwatch to an offender with the security strap;

c. monitoring an electrical signal of the conductor;

d. transmitting a status of the electrical signal of the conductor between the security strap and smartwatch;

e. providing an offender monitoring system;

f. receiving by the offender monitoring system the status of the electrical signal of the conductor between the security strap and smartwatch; and g. notifying a supervising authority or monitoring personnel of the offender monitoring system of the status of the electrical signal.

14. A method of removal detection of a wearable computer comprising the steps of:

a. providing a programmable smartwatch attached to a security strap that contains an RFID tag, which RFID tag is in communication with a smartwatch, which security strap is wearable on a wrist of an offender, and which security strap is attached to the smartwatch;

b. attaching the smartwatch to an offender with the security strap;

c. interrogating at periodic intervals by the smartwatch an identification sequence transmission of the RFID tag;

d. providing an offender monitoring system;

e. receiving by the offender monitoring system the identification sequence transmission of the RFID tag; and f. notifying a supervising authority or monitoring personnel of the offender monitoring system of the identification sequence transmission of the RFID tag.

* * * * *